United States Patent
Lee (10) Patent No.: US 11,907,783 B2
(45) Date of Patent: Feb. 20, 2024

(54) HOLOGRAM DETECTION SERVICE PROVIDING SERVER AND HOLOGRAM DETECTION METHOD

(71) Applicant: KAKAOBANK CORP., Gyeonggi-do (KR)

(72) Inventor: Dong Yul Lee, Gyeonggi-do (KR)

(73) Assignee: KAKAOBANK CORP., Gyeonggi-do (KR)

( * ) Notice: Subject to any disclaimer, the term of this patent is extended or adjusted under 35 U.S.C. 154(b) by 0 days.

(21) Appl. No.: 18/180,534

(22) Filed: Mar. 8, 2023

(65) Prior Publication Data

US 2023/0229882 A1   Jul. 20, 2023

Related U.S. Application Data

(63) Continuation of application No. 17/758,311, filed as application No. PCT/KR2021/001764 on Feb. 10, 2021, now Pat. No. 11,625,566.

(30) Foreign Application Priority Data

Feb. 12, 2020   (KR) .................. 10-2020-0016762

(51) Int. Cl.
  *G06K 19/06* (2006.01)
  *B42D 25/328* (2014.01)
  (Continued)

(52) U.S. Cl.
  CPC ..... *G06K 19/06065* (2013.01); *B42D 25/328* (2014.10); *G06T 7/11* (2017.01);
  (Continued)

(58) Field of Classification Search
  CPC ..... G06K 19/06065; G06K 2019/0629; B42D 25/328; G06T 7/11; G06T 2207/20084;
  (Continued)

(56) References Cited

U.S. PATENT DOCUMENTS 5,216,527 A * 6/1993 Sharnoff ............. G03H 1/10
                                                      359/24
10,573,018 B2   2/2020 Kutliroff et al.
(Continued)

FOREIGN PATENT DOCUMENTS

CA        2958310 A1 * 3/2016 ............ B42D 25/29
JP     2012-164235 A      8/2012
(Continued)

OTHER PUBLICATIONS

Notice of Allowance from corresponding Korean Patent Application No. 10-2020-0016762, dated Nov. 24, 2020.
(Continued)

*Primary Examiner* — Tuyen K Vo
(74) *Attorney, Agent, or Firm* — Harness, Dickey & Pierce, P.L.C.

(57) ABSTRACT

A hologram detection method according to an aspect of the disclosure, includes: inputting a first image, obtained by capturing a detection object on the basis of first flash intensity, to a neural network model to obtain a first detection result value representing the detection or not of a hologram for each of predetermined at least one detection unit regions; and comparing a threshold value with the first detection result value obtained for each detection unit region to determine the detection or not of a hologram in the first image and a first detection unit region where a hologram is detected.

6 Claims, 5 Drawing Sheets

(51) Int. Cl.
 *G06T 7/11* (2017.01)
 *G06V 10/141* (2022.01)
 *G06V 10/82* (2022.01)
 *G06V 10/25* (2022.01)
 *G06V 10/75* (2022.01)

(52) U.S. Cl.
 CPC ............ *G06V 10/141* (2022.01); *G06V 10/25* (2022.01); *G06V 10/759* (2022.01); *G06V 10/82* (2022.01); *G06K 2019/0629* (2013.01)

(58) Field of Classification Search
 CPC ....... G06T 7/001; G06T 7/136; G06V 10/141; G06V 10/25; G06V 10/759; G06V 10/82; G06V 20/95; G07D 7/0032; G06F 18/22; G06N 3/02
 See application file for complete search history.

(56) References Cited

U.S. PATENT DOCUMENTS

| | | | |
|---|---|---|---|
| 10,853,664 | B2 | 12/2020 | Ju et al. |
| 11,393,114 | B1 | 7/2022 | Ebrahimi Afrouzi et al. |
| 2015/0358400 | A1* | 12/2015 | Bartlett, II ............ H04W 12/10 709/201 |
| 2018/0068431 | A1 | 3/2018 | Takeda et al. |
| 2019/0011882 | A1 | 1/2019 | Gusyatin |
| 2019/0286902 | A1* | 9/2019 | Rowe .................. G06F 18/2451 |
| 2020/0394399 | A1* | 12/2020 | Gilbert .................. G06V 10/56 |
| 2021/0374460 | A1 | 12/2021 | Mau et al. |
| 2022/0066390 | A1 | 3/2022 | Gusyatin |
| 2023/0005254 | A1* | 1/2023 | Zhou ..................... G06V 10/60 |

FOREIGN PATENT DOCUMENTS

| | | |
|---|---|---|
| JP | 6517666 B2 | 5/2019 |
| JP | 2019-534526 A | 11/2019 |
| KR | 10-1509399 B1 | 4/2015 |
| KR | 20-0483242 Y1 | 5/2017 |
| KR | 10-2019-0106853 A | 9/2019 |
| KR | 10-2187123 B1 | 12/2020 |

OTHER PUBLICATIONS

Office Action from corresponding Korean Patent Application No. 10-2020-0016762, dated Aug. 6, 2020.
International Search Report from corresponding PCT Application No. PCT/KR2021/001764, dated Jun. 4, 2021.
Notice of Allowance from corresponding U.S. Appl. No. 17/758,311, dated Jan. 19, 2023.

* cited by examiner

HOLOGRAM DETECTION SERVICE PROVIDING SERVER AND HOLOGRAM DETECTION METHOD

CROSS-REFERENCE TO RELATED APPLICATIONS

This application is a continuation application of U.S. patent application Ser. No. 17/758,311, filed on 1 Jul. 2022, which is a national phase application of PCT Application No. PCT/KR2021/001764, filed on 10 Feb. 2021, which claims the benefit and priority to Korean Patent Application No. 10-2020-0016762, filed on 12 Feb. 2020. The entire disclosures of the applications identified in this paragraph are incorporated herein by references.

TECHNICAL FIELD

The disclosure relates to a server and method for detecting a hologram.

BACKGROUND ART

Generally, in order to check authenticity of an object having significant values like paper money, identification cards, or credit cards, an authenticity determination means is inserted into a corresponding object. A hologram is being widely used as the authenticity determination means.

In offline transaction of the related art, authenticity of a corresponding object may be determined by checking a hologram with eyes, but in online transaction where use thereof is rapidly increasing recently, it is very difficult to check the hologram with eyes.

Particularly, in an Internet banking service, because all banking operations as well as account establishment are performed by an online scheme, authentication of a user is performed by using an identification card image obtained by capturing an identification card of the user, but because it is not easy to detect a hologram in an identification card image, an operation of checking authenticity of an identification card has a problem where authentication of a user may not normally be performed.

DISCLOSURE

Technical Problem

The disclosure is devised to solve the above-described problem and is for providing a hologram detection service providing server and a hologram detection method, which may automatically detect a hologram from a detection object by using a deep learning-based neural network model.

Moreover, the disclosure is for providing a hologram detection service providing server and a hologram detection method, which may determine authenticity of an identification card by detecting a hologram.

Moreover, the disclosure is for providing a hologram detection service providing server and a hologram detection method, which may determine the presence of a hologram in a predetermined region of an identification card to determine authenticity of the identification card.

Technical Solution

A hologram detection method according to an aspect of the disclosure for accomplishing the above-described objects includes: inputting a first image, obtained by capturing a detection object on the basis of first flash intensity, to a neural network model to obtain a first detection result value representing the detection or not of a hologram for each of predetermined at least one detection unit regions; and comparing a threshold value with the first detection result value obtained for each detection unit region to determine the detection or not of a hologram in the first image and a first detection unit region where a hologram is detected.

A hologram detection method according to another aspect of the disclosure for accomplishing the above-described objects includes: obtaining a first detection result value for each of predetermined at least one detection unit regions by attempting to detect a hologram for each of the predetermined at least one detection unit regions with respect to a first image obtained by capturing a detection object on the basis of first flash intensity; obtaining a second detection result value for each of the predetermined at least one detection unit regions by attempting to detect a hologram for each of the predetermined at least one detection unit regions with respect to a second image obtained by capturing the detection object on the basis of second flash intensity; and determining the authenticity or not of the detection object on the basis of the first detection result value and the second detection result value.

A hologram detection service providing server according to another aspect of the disclosure includes: a hologram detector configured to obtain a detection result value for each detection unit region by attempting to detect a hologram for each of at least one detection unit regions, with respect to each of a plurality of images obtained by capturing a detection object on the basis of different flash intensities; and an authenticity determiner configured to determine the authenticity or not of the detection object on the basis of a first detection result value obtained for each detection unit region in a first image, captured based on first flash intensity, of the plurality of images and a second detection result value obtained for each detection unit region in a second image, captured based on second flash intensity, of the plurality of images.

Advantageous Effect

According to the disclosure, there is an effect where the detection or not of a hologram in an image obtained by capturing a detection object may be accurately determined by using a deep learning-based neural network model.

Moreover, according to the disclosure, because the detection of a hologram is attempted for each predetermined detection unit region in an image obtained by capturing a detection object, a hologram detection speed may be enhanced compared to the detection of a hologram in a whole image, and moreover, a possibility of an error capable of occurring in a region including no hologram may be reduced, whereby there is an effect for enhancing the accuracy of hologram detection.

Moreover, according to the disclosure, because authenticity of a detection object may be determined through the detection or not of a normal hologram in a plurality of images obtained by capturing the detection object on the basis of different flash intensities, authenticity of the detection object may be automatically determined, and thus, separate personnel for determining authenticity of the detection object may not be needed, whereby there is an effect for reducing system maintenance cost.

MODE FOR INVENTION

Like reference numerals refer to like elements throughout. In the below description, elements and functions that are irrelevant to the essentials of the disclosure and have been known to those skilled in the art may be omitted. Meanings of the terms described herein should be understood as follows.

Advantages and features of the disclosure, and implementation methods thereof will be clarified through following embodiments described with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Furthermore, the disclosure is only defined by scopes of claims.

A shape, a size, a ratio, an angle, and a number disclosed in the drawings for describing embodiments of the disclosure are merely an example, and thus, the disclosure is not limited to the illustrated details. Like reference numerals refer to like elements throughout. In the following description, when the detailed description of the relevant known technology is determined to unnecessarily obscure the important point of the disclosure, the detailed description will be omitted.

In a case where 'comprise', 'have', and 'include' described herein are used, another part may be added unless 'only~' is used. The terms of a singular form may include plural forms unless referred to the contrary.

In construing an element, the element is construed as including an error range although there is no explicit description.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the disclosure may be partially or overall coupled to or combined with each other, and may be variously inter-operated with each other and driven technically as those skilled in the art can sufficiently understand. The embodiments of the disclosure may be carried out independently from each other, or may be carried out together in co-dependent relationship.

Hereinafter, embodiments according to the disclosure will be described in detail with reference to the accompanying drawings.

Figure 1:
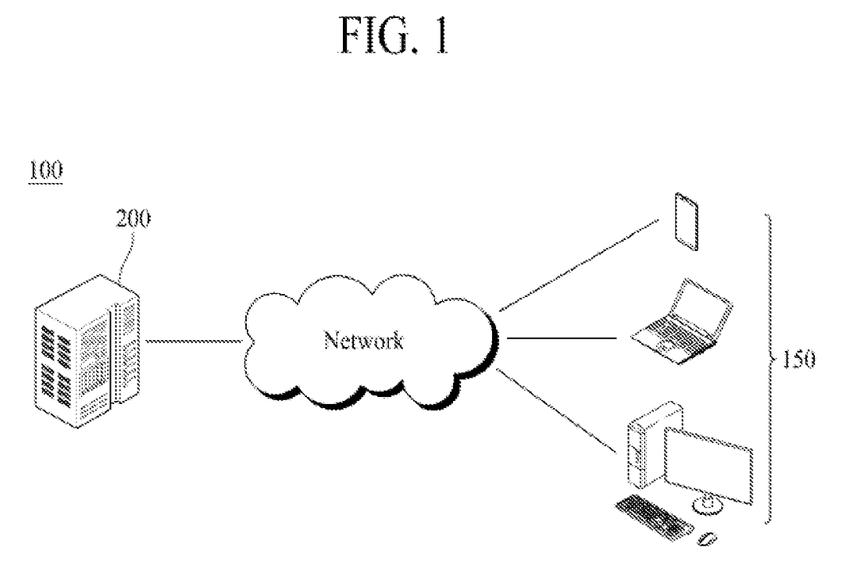
FIG. 1 is a diagram illustrating a hologram detection service providing system according to an embodiment of the disclosure.

FIG. 1 is a diagram illustrating a hologram detection service providing system according to an embodiment of the disclosure.

A hologram detection service providing system 100 according to the disclosure is for detecting a hologram from a detection object, and as illustrated in FIG. 1, includes a user terminal 150 and a hologram detection service providing server 200. Particularly, the hologram detection service providing system 100 according to the disclosure may determine the authenticity or not of a detection object on the basis of a hologram detection result.

In an embodiment, the hologram detection service providing system 100 according to the disclosure may be an Internet banking service providing system. According to such an embodiment, the hologram detection service providing system 100 according to the disclosure may detect a hologram from an identification card of a user and may determine the authenticity or not of the identification card by using a result of the detection. In another embodiment, the hologram detection service providing system according to the disclosure may detect a hologram from a credit card or paper money and may determine the authenticity or not of the credit card or the paper money by using a result of the detection.

The user terminal 150 cooperates with the hologram detection service providing server 200 over a network and provides a user with a service which detects a hologram and determines the authenticity or not of a detection object on the basis of the hologram detection.

In detail, when the determination of authenticity of a detection object is needed, a service providing application installed in the user terminal 150 generates an image obtained by capturing the detection object and requests the determination of authenticity of the detection object from the hologram detection service providing server 200.

In an embodiment, when the hologram detection service providing system 100 is the Internet banking service providing system, the service providing application may capture an identification card to generate an identification card image so as to perform authentication on a user in performing a banking operation such as account establishment and may transfer the generated identification card image to the hologram detection service providing server 200, and thus, may request the determination of authenticity of the identification card.

Particularly, the service providing application according to the disclosure may capture a detection object while varying flash intensity of a flash installed in the user terminal 150 in capturing the detection object, on the basis of a request of the hologram detection service providing server 200.

In an embodiment, the flash intensity may be set to one step within a range of first to $n^{th}$ steps (where n is a natural number of 2 or more). For example, flash intensity of the first step may denote a state where the flash of the user terminal 150 is turned off (OFF), and flash intensity of the $n^{th}$ step may denote a state where the flash of the user terminal 150 has maximum brightness. As another example, flash intensity of the first step may denote a state where the flash of the user terminal 150 has maximum brightness, and flash intensity of the $n^{th}$ step may denote a state where the flash of the user terminal 150 is turned off (OFF).

In the above-described embodiment, it has been described that intensity of the flash is set to one of the first to $n^{th}$ steps, but in another embodiment, intensity of the flash may be set to one value within a flash intensity range defined based on an upper limit value and a lower limit value. In this case, a lower limit value of flash intensity may denote a state where the flash is turned off or a maximum brightness state of the flash, and an upper limit value of flash intensity may denote the maximum brightness state of the flash or a state where the flash is turned off.

In the above-described embodiment, it has been described that the service providing application directly sets flash intensity, but in another embodiment, the service providing application may provide a flash intensity adjustment request message to a user, and thus, the user may directly adjust flash intensity.

When a setting of flash intensity is completed, the service providing application issues a request to capture a detection object on the basis of set flash intensity with a camera module (not shown) installed in the user terminal 150. When an image obtained by capturing the detection object is received from the camera module, the service providing application transfers the received image to the hologram detection service providing server 200 through a communication module (not shown) equipped in the user terminal 150.

For example, when a first image is generated by capturing a detection object on the basis of first flash intensity, the service providing application may transmit the first image to the hologram detection service providing server 200 through the communication module.

Furthermore, when a request to set new flash intensity for capturing a detection object is issued from the hologram detection service providing server 200, the service providing application may re-set flash intensity of the flash on the basis of a corresponding request.

This is because the hologram detection service providing server 200 performs detection of a hologram and determination of authenticity of a detection object by using a plurality of images obtained by capturing the detection object on the basis of different flash intensities, and thus, when an image is obtained by capturing the detection object on the basis of one flash intensity, an image obtained by capturing the detection object on the basis of flash intensity which differs from corresponding flash intensity is needed.

Particularly, when detection of a hologram in a captured image on the basis of specific flash intensity fails, or a hologram is detected in two images obtained based on different flash intensities but a hologram is detected in the same region in each image, the hologram detection service providing server 200 may issue a request to set new flash intensity, and thus, may also perform detection of the hologram and determination of authenticity of the detection object by using the captured image on the basis of the new flash intensity.

Therefore, the service providing application may set new flash intensity in a maximum step (or an upper limit value) of flash intensity on the basis of a request of the hologram detection service providing server 200 until the detection of the hologram and the determination of authenticity of the detection object are completed by the hologram detection service providing server 200 and may provide an image, captured based on the set new flash intensity, to the hologram detection service providing server 200.

According to such an embodiment, the service providing service may attempt to capture the detection object while sequentially increasing flash intensity up to a maximum step (or an upper limit value) from a minimum step (or a lower limit value) or sequentially decreasing the flash intensity up to the minimum step (or the lower limit value) from the maximum step (or the upper limit value), and when capturing of the detection objection on the basis of flash intensity of all steps (or all values) is completed, the service providing service may transfer a capture completion message to the hologram detection service providing server 200.

When the detection of the hologram and the determination of authenticity of the detection object are completed by the hologram detection service providing server 200, the service providing application may receive a determination result of authenticity from the hologram detection service providing server 200 and may provide the determination result to the user.

Furthermore, when the hologram detection service providing system 100 is the Internet banking service providing system, the service providing application according to the disclosure may receive an account establishment request or an account transfer request from the user and may transfer the received account establishment request or account transfer request to the hologram detection service providing server 200. In this case, an account may be established or transfer-requested money may be transferred by the hologram detection service providing server 200.

The service providing application described above may be downloaded through online market such as App Store or Google Play and may be installed in the user terminal 150 or may be installed in manufacturing a terminal in a terminal manufacturer.

Furthermore, the user terminal 150 where the service providing application according to the disclosure is installed may include a personal computer (PC) or a notebook computer including a wired Internet access and browsing function, a notebook computer or a portable terminal including a wireless LAN/portable Internet access and browsing function, or a personal communication system (PCS), a global system for mobile (GSM) terminal, a personal digital assistant (PDA), or a smartphone including a mobile communication network access and browsing function.

Particularly, the user terminal 150 according to the disclosure may include a camera module and a flash enabling adjustment of intensity, so as to generate the image obtained by capturing the detection object.

However, the disclosure is not limited thereto, the user terminal 150 may not separately include the camera module and the flash, the user may capture the detection object by using a separate camera module and flash, and the service providing application may receive the image obtained by capturing the detection object from the user through a storage medium or Internet and may provide the received image to the hologram detection service providing server 200.

The hologram detection service providing server 200 performs a function of detecting a hologram and determining authenticity of a detection object. Particularly, the hologram detection service providing server 200 according to the disclosure receives an image of the detection object from the service providing application installed in the user terminal 150 and performs detection of the hologram and determination of authenticity of the detection object from the received image.

Hereinafter, the hologram detection service providing server 200 according to the disclosure will be described in more detail with reference to FIG. 2.

Figure 2:
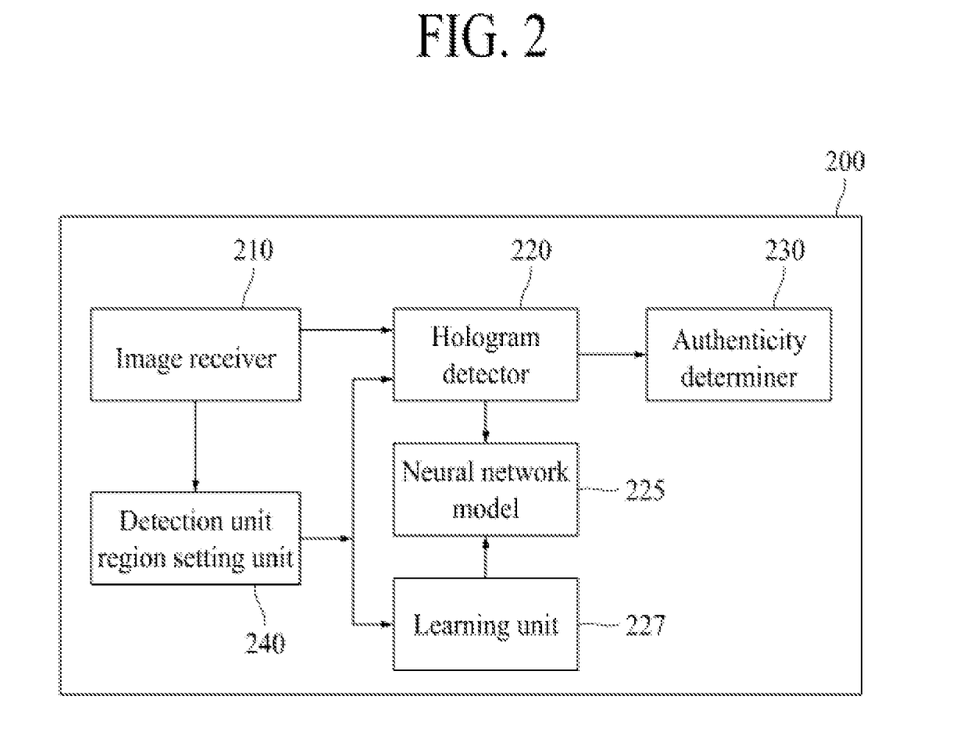
FIG. 2 is a diagram illustrating a configuration of a hologram detection service providing system according to an embodiment of the disclosure.

FIG. 2 is a diagram illustrating a configuration of the hologram detection service providing system 200 according to an embodiment of the disclosure. As illustrated in FIG. 2, the hologram detection service providing system 200 includes an image receiver 210, a detection unit region setting unit 240, a hologram detector 220, a neural network model 225, and an authenticity determiner 230.

The image receiver 210 receives an image, obtained by capturing a detection object, from the user terminal 150. In an embodiment, the image receiver 210 may sequentially receive n number of images, obtained by capturing the detection object on the basis of different flash intensities, from the user terminal 150. For example, the image receiver 210 may receive a first image obtained by capturing the detection object on the basis of the first flash intensity, a second image obtained by capturing the detection object on the basis of second flash intensity, and an $n^{th}$ image obtained by capturing the detection object on the basis of $n^{th}$ flash intensity.

At this time, after the image receiver 210 receives an image obtained by capturing the detection object on the basis of specific flash intensity, the image receiver 210 may generate a request for increasing the specific flash intensity or a request for decreasing the specific flash intensity on the basis of a request of the hologram detector 220 or the authenticity determiner 230 and may provide the generated request to the service providing application through the user terminal 150.

For example, after the image receiver 210 receives the first image obtained by capturing the detection object on the basis of the first flash intensity, the image receiver 210 may generate a request for increasing or decreasing flash intensity on the basis of a request of the hologram detector 220 or the authenticity determiner 230 and may transmit the generated request to the service providing application of the user terminal 150. Accordingly, the image receiver 210 receives the second image, obtained by capturing the detection object on the basis of the second flash intensity increased or decreased compared to the first flash intensity, from the user terminal 150.

Moreover, when hologram detection is not normally performed by the hologram detector 220 or a new hologram is not detected by the authenticity determiner 230, the image receiver 210 generates a request for additionally increasing or decreasing flash intensity and transmits the generated request to the service providing application of the user terminal 150, on the basis of a request of the hologram detector 220 or the authenticity determiner 230. Therefore, the image receiver 210 receives the third image, obtained by capturing the detection object on the basis of the third flash intensity increased or decreased compared to the second flash intensity, from the user terminal 150.

For example, when hologram detection is not normally performed by the hologram detector 220 or a new hologram is not detected by the authenticity determiner 230, the image receiver 210 continuously generates a request for additionally increasing or decreasing flash intensity and transmits the generated request to the service providing application of the user terminal 150, on the basis of a request of the hologram detector 220 or the authenticity determiner 230, and thus, sequentially receives the $n^{th}$ image, obtained by capturing the detection object on the basis of the fourth to $n^{th}$ flash intensity from a fourth image obtained by capturing the detection object on the basis of fourth flash intensity, from the user terminal 150.

The detection unit region setting unit 240 sets at least one predetermined detection unit region on an image which is a hologram detection object. In this case, a detection unit region may be set by pixel group units configured with a plurality of pixels.

In an embodiment, the detection unit region setting unit 240 randomly sets n number of detection unit regions on an image which is a detection object, and the number of pixels configuring each detection unit region may be differently set.

In another embodiment, the detection unit region setting unit 240 may set a region, including a photograph in an image which is a detection object, to a first region and may divide a region except the first region into n number of regions to additionally set n number of second regions. In this case, the second region may include at least one of a region including a name and a region including an issued date of a detection object.

In another embodiment, the detection unit region setting unit 240 may set a region, including a photograph in an image which is a detection object, to a first region, set a region including a name to a second region, and set a region, including an issued date of a detection object, to a third region.

In the disclosure, the reason that the detection unit region setting unit 240 sets at least one detection unit region in an image is because, when the hologram detector 220 performs hologram detection on a whole image, a hologram detection speed may increase, and moreover, an error may occur in a region where there is no hologram.

Therefore, comparing with an operation of detecting a hologram on a whole image, because the disclosure sets at least one detection unit region on one image by using the detection unit region setting unit 240 and performs hologram detection for each detection unit region, the disclosure may enhance a hologram detection speed, and moreover, may reduce a possibility of an error capable of occurring in a region including no hologram, thereby enhancing the accuracy of hologram detection.

The hologram detector 220 attempts to detect a hologram for each detection unit region set by the detection unit region setting unit 240 in each image received by the image receiver 210. In an embodiment, when the hologram detector 220 inputs each image, received by the image receiver 210, to the neural network model 225, the neural network model 225 may attempt to detect the hologram for each detection unit region in the input image. Accordingly, the hologram detector 220 outputs a detection result value representing whether a hologram is in each detection unit region.

Figure 3:
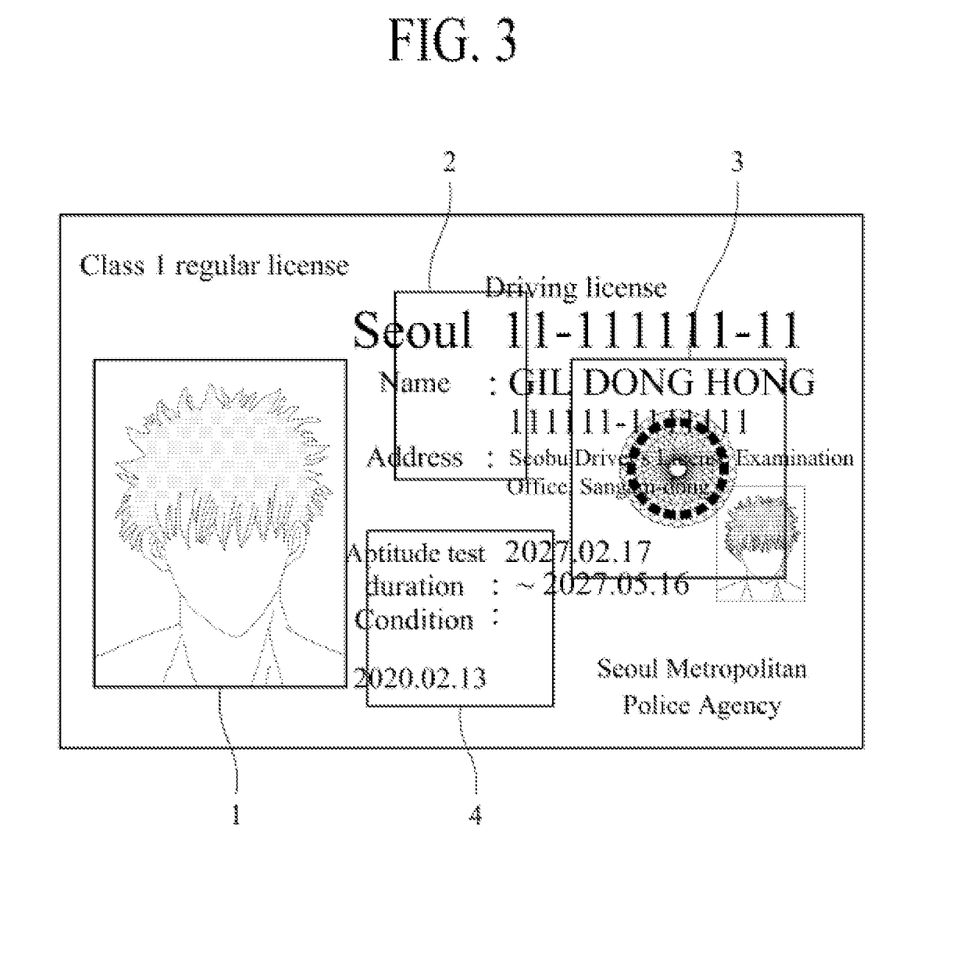
FIG. 3 is a diagram illustrating an example of a detection unit region provided in an identification card image when a detection object is an identification card.

For example, as illustrated in FIG. 3, in a case where the detection unit region setting unit 240 sets four regions (a first region 1, a second region 2, a third region 3, and a fourth region 4) on an image of a detection object, when the hologram detector 220 inputs a corresponding image to the neural network model 225, the neural network model 225 detects whether a hologram is in each of the first region 1, the second region 2, the third region 3, and the fourth region 4, and thus, outputs a detection result value.

According to such an embodiment, the hologram detector 220 inputs a corresponding image to the neural network model 225, and thus, obtains a first detection result value from the first region 1, obtains a second detection result value from the second region 2, obtains a third detection result value from the third region 3, and obtains a fourth detection result value from the fourth region 4.

As described above, according to the disclosure, because the neural network model 225 performs hologram detection on each detection unit region set in one image, a detection result value representing whether a hologram is in each detection unit region may be obtained, and thus, fast processing is possible compared to an operation of detecting whether there is a hologram on a whole image.

Referring again to FIG. 2, the neural network model 225 detects whether a hologram is in each detection unit region of an image input by the hologram detector 220 and outputs a detection result value.

In an embodiment, the neural network model 225 may be a model which is generated by a deep neural network (DNN) algorithm configured with a convolution neural network (CNN). However, this is merely an embodiment and the neural network model 225 may be implemented with a recurrent neural network (RNN) algorithm or a neural network (NN) algorithm.

Particularly, the neural network model 225 according to the disclosure may be learned by using an image corresponding to a detection unit region, where a shape of a hologram is formed, of detection unit regions included in one image. This is because reflection of a hologram may strongly occur in a region, where a shape of a hologram is formed, of detection unit regions because the hologram has a specific shape, and thus, when the neural network model 225 is learned by using an image corresponding to a region where a shape of a hologram is formed, learning efficiency may be enhanced and overfitting may be prevented.

Hereinafter, the neural network model 225 according to the disclosure will be described in more detail with reference to FIG. 4.

Figure 4:
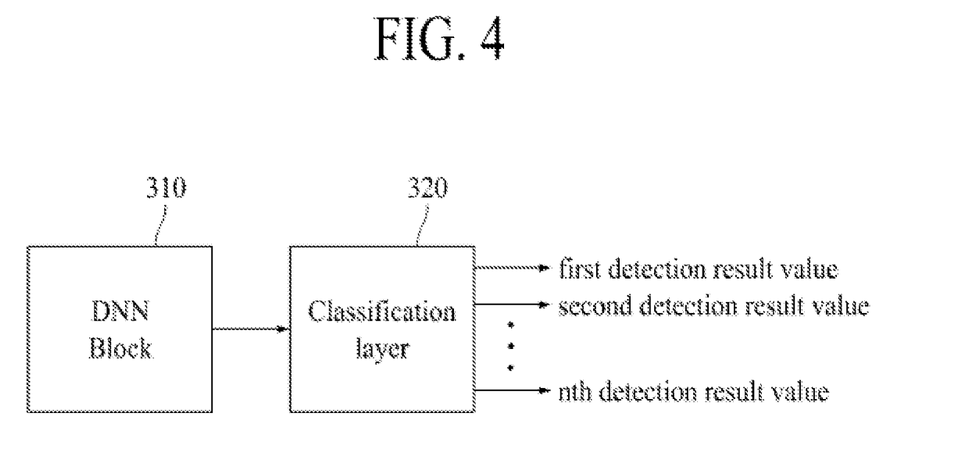
FIG. 4 is a diagram schematically illustrating a configuration of a neural network model according to an embodiment of the disclosure.

FIG. 4 is a diagram schematically illustrating a configuration of a neural network model according to an embodiment of the disclosure. As illustrated in FIG. 4, the neural network model 225 according to the disclosure includes a DNN block, configured with a CNN, and a classification layer 320.

The DNN block 310 is configured with a CNN and allows an image input by the hologram detector 220 to sequentially pass through at least one convolution layer, thereby generating a plurality of feature maps. In this case, the DNN block 310 may apply a convolution filter having a predetermined size to an image corresponding to each detection unit region so as to generate a plurality of feature maps.

The DNN block 310 may apply an activation function to the plurality of feature maps generated through application of the convolution filter to assign a nonlinear characteristic to the plurality of feature maps, and then, may output a feature map, to which the nonlinear characteristic is assigned, to the classification layer 320.

The classification layer 320 applies a predetermined dimension decrease function to the plurality of feature maps output from the DNN block 310 to decrease a dimension of a feature map, and thus, outputs a detection result value representing whether a hologram is in each detection unit region. That is, when n number of detection unit regions are set on an image, the classification layer 320 outputs first to $n^{th}$ detection result values which are detection result values for each of the n detection unit regions.

In an embodiment, the classification layer 320 may be implemented as a layer where average pooling or full connection (fully connected) is performed on a dimension-decreased feature map by the number of detection unit regions.

Referring again to FIG. 2, the hologram detection service providing server 200 according to the disclosure may further include a learning unit 227 which allows the neural network model 225 to learn, thereby enhancing the accuracy of hologram detection.

In detail, the learning unit 227 allows the neural network model 225 to learn by using a plurality of learning images. In an embodiment, the learning unit 227 sets a plurality of regions, where the presence of a hologram corresponding to a plurality of learning images has been checked, and performs labeling on each of the plurality of regions. For example, the learning unit 227 labels a region, where there is a hologram, to 1 and labels a region, where there is no hologram, to 0. As another example, the learning unit 227 may label a region, where there is a hologram, to 0 and labels a region, where there is no hologram, to 1.

According to such an embodiment, the learning unit 227 may allow the neural network model 225 to learn with a plurality of learning images labeled to 0 or 1. In an embodiment, as illustrated in FIG. 4, the learning unit 227 may perform an arithmetic operation on a detection result value output from the classification layer 320 and a right answer value of a corresponding learning image by using a predetermined loss function in learning with a learning image and may feed back a calculated result value to the DNN block 310 and the classification layer 320 to readjust a coefficient of each of filters applied to the DNN block 310 and the classification layer 320. In an embodiment, a mean square error may be applied as a loss function.

The hologram detector 220 determines the presence of a hologram in a corresponding image and a detection unit region where a hologram is detected, on the basis of a detection result value of each of detection unit regions in each image received by the image receiver 210. In an embodiment, when there is a detection unit region where the detection result value of each detection unit region included in the image is greater than or equal to a predetermined threshold value, the hologram detector 220 determines that a hologram is in a corresponding image and determines a detection unit region, where a detection result value greater than or equal to the threshold value is output, as a detection unit region where there is a hologram.

For example, in a case where the threshold value is 0.5, when a first detection result value of a first region of the detection unit regions is 0.5, a first detection result value of a second region is 0.3, a first detection result value of a third region is 0.2, and a first detection result value of a fourth region is 0.1, the first detection result value of the first region may be 0.5, and thus, the hologram detector 220 may determine that a hologram is in the first image and may determine that the first region is a detection unit region where there is a hologram.

Furthermore, when all detection result values of each detection unit region included in a corresponding image are greater than or equal to the predetermined threshold value, the hologram detector 220 may determine that a hologram is not in the corresponding image. In this case, the hologram detector 220 provides the service providing application with a request for increasing or decreasing flash intensity by using the image receiver 220.

The hologram detector 220 determines whether a hologram is in an image, received whenever a new image is received by the image receiver 220, and determines a detection unit region where there is a hologram.

The authenticity determiner 230 compares a first detection unit region, where it is determined that a hologram is detected in the first image by the hologram detector 220, with a second detection unit region where it is determined that a hologram is detected in the second image, thereby determining the authenticity or not of a detection object.

In detail, when the second detection unit region differs from the first detection unit region, the authenticity determiner 230 determines that a corresponding detection object is normal. In an embodiment, the authenticity determiner 230 may transmit the first image (or the second image), determined to be normal, to a management server (not shown), and thus, may allow the management server to perform character recognition from the first image by using an optical character reader (OCR) function.

In this case, the first image denotes an image which is first received by the image receiver 210, the second image denotes an image which is received after the first image is received by the image receiver 210, the first image is an image obtained by capturing a detection object on the basis of the first flash intensity, and the second image is an image obtained by capturing a detection object on the basis of the second flash intensity.

Furthermore, when the second detection unit region is the same as the first detection unit region, the authenticity determiner 230 determines that a new hologram is not detected and provides the service providing application with a request for increasing or decreasing flash intensity by using the image receiver 220.

The authenticity determiner 230 compares a third detection unit region, where a hologram is in the third image received after the second image is received by the image receiver 210, with the first detection unit region to determine whether the third detection unit region is the same as the first detection unit region, and when the third detection unit region differs from the first detection unit region, the authenticity determiner 230 determines that a corresponding detection object is normal.

However, when the third detection unit region is the same as the first detection unit region, the authenticity determiner 230 provides the service providing application with a request for increasing or decreasing flash intensity until current flash intensity reaches a maximum step (or an upper limit value) or a minimum step (or a lower limit value), and thus, compares a detection unit region, where it is determined that a hologram is in a captured image on the basis of new flash intensity, with the first detection unit region to repeatedly attempt to determine the authenticity or not of a detection object.

When the first detection unit region is the same as an $n^{th}$ detection unit region where it is determined that a hologram is in the $n^{th}$ image captured based on flash intensity of the $n^{th}$ step corresponding to the maximum step or the minimum step, the authenticity determiner 230 determines that a corresponding detection object is abnormal. According to such an embodiment, the authenticity determiner 230 transmits, to the management server, an image obtained by capturing a detection object on the basis of lowest flash intensity for additionally determining authenticity and an image obtained by capturing the detection object on the basis of highest flash intensity.

In the above-described embodiment, it has been described that the management server is separately provided, but this is merely an embodiment and the hologram detection service providing server 200 may simultaneously perform a function of the management server.

Hereinafter, a hologram detection member according to the disclosure will be described in more detail with reference to FIG. 5.

Figure 5:
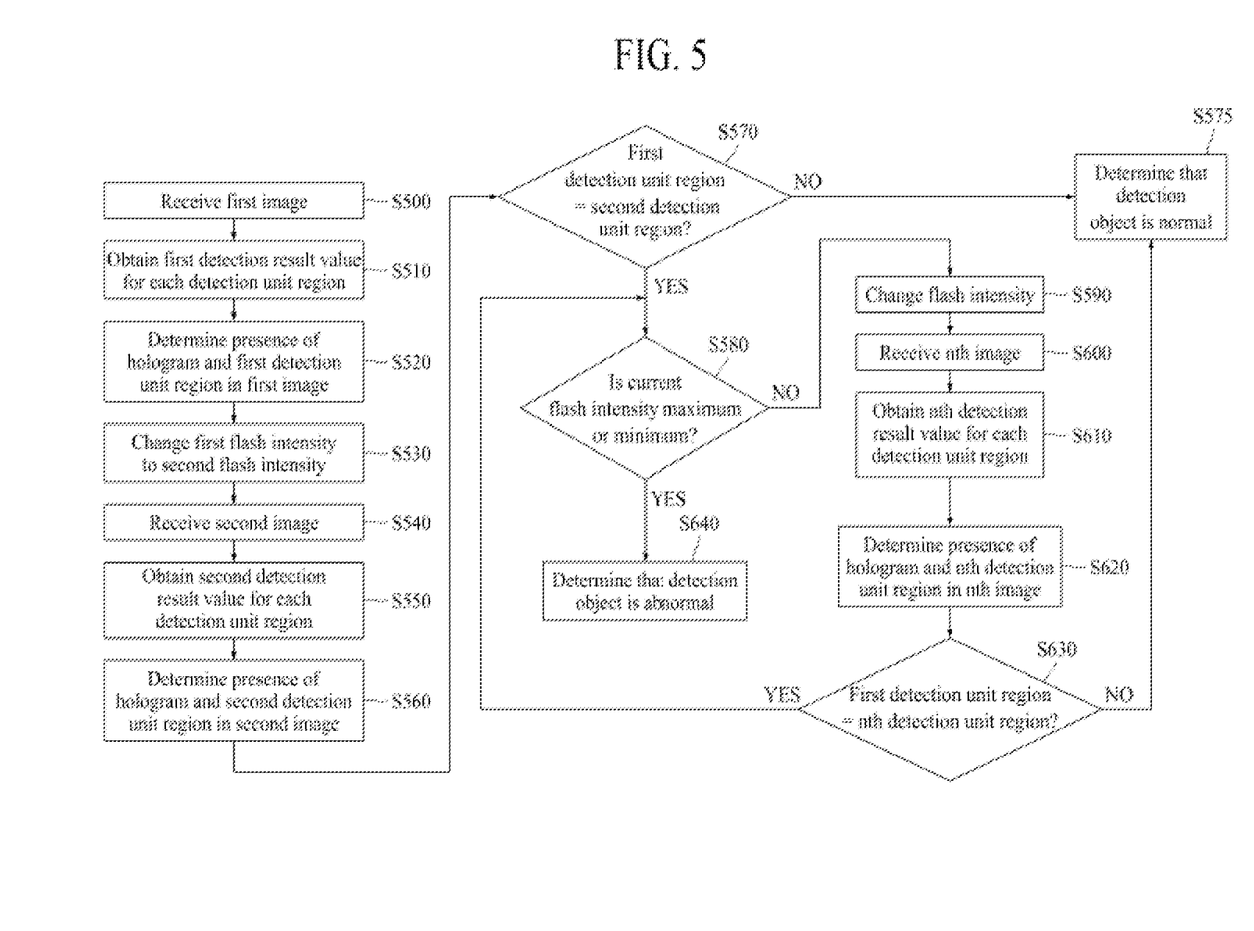
FIG. 5 is a flowchart illustrating a hologram detection method according to an embodiment of the disclosure.

FIG. 5 is a flowchart illustrating a hologram detection method according to an embodiment of the disclosure. The hologram detection method illustrated in FIG. 5 may be performed by the hologram detection service providing server illustrated in FIG. 2.

First, the hologram detection service providing server receives a first image, obtained by capturing a detection object on the basis of first flash intensity, from a user terminal (S500). In an embodiment, the first flash intensity may denote a flash off state.

Subsequently, the hologram detection service providing server inputs the first image to a neural network model to obtain a first detection result value for each detection unit region included in the first image (S510).

In an embodiment, each detection unit region may be set by pixel group units configured with a plurality of pixels. According to such an embodiment, the hologram detection service providing server may randomly set at least one detection unit region for the first image. In this case, the number of pixels configuring each detection unit region may be differently set.

In another embodiment, the hologram detection service providing server may set a region, including a photograph in the first image, to a first region and may divide a region except the first region into n number of regions to additionally set n number of second regions. In this case, the second region may include at least one of a region including a name and a region including an issued date of a detection object.

In another embodiment, the hologram detection service providing server may set a region, including a photograph in the first image, to the first region, set a region including a name to the second region, and set a region, including an issued date of a detection object, to a third region.

Subsequently, the hologram detection service providing server determines the presence of a hologram in the first image and a first detection unit region where a hologram is detected, on the basis of a first detection result value obtained for each detection unit regions of the first image (S520).

In an embodiment, when there is a detection unit region, where the first detection result value is greater than or equal to a threshold value, of detection unit regions included in the first image, the hologram detection service providing server determines that a hologram is in the first image and determines a detection unit region, where the first detection result value greater than or equal to the threshold value is obtained, as the first detection unit region where there is a hologram.

Subsequently, the hologram detection service providing server transmits, to the user terminal, a request for increasing or decreasing intensity of a flash from the first flash intensity to the second flash intensity (S530) and receives a second image, obtained by capturing a detection object on the basis of the second flash intensity, from the user terminal (S540).

Subsequently, the hologram detection service providing server inputs the received second image to the neural network model to obtain a second detection result value for each detection unit region included in the second image (S550).

Subsequently, the hologram detection service providing server determines the presence of a hologram in the second image and a detection unit region where a hologram is detected, on the basis of a second detection result value obtained for each detection unit region of the second image (S560).

In an embodiment, when there is a detection unit region, where the second detection result value is greater than or equal to the threshold value, of detection unit regions included in the second image, the hologram detection service providing server determines that a hologram is in the second image and determines a detection unit region, where the second detection result value greater than or equal to the threshold value is obtained, as the second detection unit region where there is a hologram.

Subsequently, the hologram detection service providing server compares the first detection unit region with the second detection unit region to determine whether the first detection unit region is the same as the second detection unit region (S570). When the first detection unit region differs from the second detection unit region as a result of the comparison, the hologram detection service providing server determines that a corresponding detection object is normal (S575) and transmits the first image (or the second image) to the management server.

Furthermore, when the first detection unit region is the same as the second detection unit region as a determination result of S570 or a hologram is not detected in the second image, the hologram detection service providing server determines whether current intensity of a flash is a maximum step or a minimum step (S580).

When the flash intensity is the maximum step or the minimum step as a result of the determination, the hologram detection service providing server changes (increases or decreases) the flash intensity by a predetermined value or a predetermined step (S590) and receives an $n^{th}$ image, obtained by capturing the detection object on the basis of $n^{th}$ flash intensity which is changed flash intensity, from the user terminal (S600).

Subsequently, the hologram detection service providing server inputs the $n^{th}$ image to the neural network model to obtain an $n^{th}$ detection result value for each detection unit region included in the $n^{th}$ image (S610) and determines the presence of a hologram in the $n^{th}$ image and a detection unit region where a hologram is detected, on the basis of an $n^{th}$ detection result value obtained for each detection unit region of the $n^{th}$ image (S620).

Subsequently, the hologram detection service providing server compares the first detection unit region with the $n^{th}$ detection unit region to determine whether the first detection unit region is the same as the $n^{th}$ detection unit region (S630). When the first detection unit region differs from the $n^{th}$ detection unit region as a result of the comparison, the hologram detection service providing server determines that a corresponding detection object is normal (S575) and transmits the first image to the management server. When the first detection unit region is the same as the $n^{th}$ detection unit region as a determination result of S630 or a hologram is not detected in the $n^{th}$ image, the hologram detection service providing server returns to S580.

Furthermore, when current flash intensity is the maximum step or the minimum step as a determination result of S580, the hologram detection service providing server determines that a corresponding detection object is abnormal (S640). In this case, the hologram detection service providing server transmits, to the management server, an image obtained by capturing a detection object on the basis of lowest flash intensity for additionally determining authenticity and an image obtained by capturing the detection object on the basis of highest flash intensity.

Those skilled in the art may understood the disclosure described above is capable of being executed in another detailed form without changing the technical spirit or essential feature of the disclosure.

For example, a configuration of the hologram detection service providing server illustrated in FIG. 2 may be implemented in a program form. In a case where a configuration of the hologram detection service providing server according to the disclosure is implemented as a program, each of the elements illustrated in FIG. 2 may be implemented as a code, and codes for implementing a specific function may be implemented as one program or may be implemented by dividing a plurality of programs.

Therefore, it should be construed that the scope of the disclosure is defined by the below-described claims instead of the detailed description, and the meanings and scope of the claims and all variations or modified forms inferred from their equivalent concepts are included in the scope of the disclosure.

What is claimed is:

1. A hologram detection method, the hologram detection method comprising:
    setting a plurality of detection unit regions located at different positions in a detection object;
    obtaining a first image by capturing the detection object in a flash off state;
    inputting the first image to a neural network model to obtain a first detection result value representing whether a hologram is detected and a detection region for each of the plurality of detection unit regions;
    changing flash intensity in a flash on state;
    obtaining a second image by capturing the detection object on the basis of the changed flash intensity;
    inputting the second image to the neural network model to obtain a second detection result value representing whether a hologram is detected and a detection region for each of the plurality of detection unit regions;
    comparing the detection region of the first detection result value and the second detection result value to determine the authenticity or not of the detection object, and when the detection region where the hologram is detected is different from each other, determining that the detection object is normal,
    wherein the neural network model is learned by using a plurality of learning images,
    wherein each of the plurality of learning images includes a plurality of regions, where the presence of a hologram has been checked, and each of the plurality of regions includes labeling value representing whether a hologram is present.

2. The hologram detection method of claim 1, wherein the changing flash intensity in the flash on state comprises, changing the flash intensity step-by-step from a minimum flash intensity to a maximum flash intensity based on a preset criterion.

3. The hologram detection method of claim 1, further comprising:
    when the hologram is not detected or the detection region of the first detection result value is the same as the detection region of the second detection result value, changing the flash intensity; and
    re-performing the obtaining the second image by capturing the detection object on the basis of the changed flash intensity, the inputting the second image to the neural network model to obtain the second detection result value, the comparing the detection region of the first detection result value and the second detection result value to determine the authenticity or not of the detection object.

4. A hologram detection service providing server, the hologram detection service providing server comprising:
    a detection unit region setting unit configured to set a plurality of detection unit regions located at different positions in a detection object;
    an image receiver configured to receive a first image obtained by capturing the detection object in a flash off state and a second image obtained by capturing the detection object on the basis of a flash intensity in a flash on state;
    a hologram detector configured to input the first image to a neural network model to obtain a first detection result value representing whether a hologram is detected and a detection region for each of the plurality of detection unit regions, and input the second image to the neural network model to obtain a second detection result value representing whether a hologram is detected and a detection region for each of the plurality of detection unit regions;

an authenticity determiner configured to compare the detection region of the first detection result value and the second detection result value to determine the authenticity or not of the detection object, and determine that the detection object is normal when the detection region where the hologram is detected is different from each other;

wherein the neural network model is learned by using a plurality of learning images, wherein each of the plurality of learning images includes a plurality of regions, where the presence of a hologram has been checked, and each of the plurality of regions includes labeling value representing whether a hologram is present.

5. The hologram detection service providing server of claim 4, wherein the second image is obtained by capturing the detection object on the basis of the flash intensity changed step-by-step from a minimum flash intensity to a maximum flash intensity in the flash on state based on a preset criterion.

6. The hologram detection service providing server of claim 4, wherein, when the hologram is not detected in the second image or the detection region where the hologram is detected in the second image is the same as the detection region where the hologram is detected in the first image, the image receiver receives the second image obtained by capturing the detection object on the basis of changed flash intensity in the flash on state.

* * * * *